United States Patent [19]

Kawakami et al.

[11] Patent Number: 4,664,167

[45] Date of Patent: May 12, 1987

[54] RADIAL TIRE FOR INDUSTRIAL VEHICLES

[75] Inventors: Masafumi Kawakami; Takashi Nishimura, both of Kobe, Japan

[73] Assignee: Sumitomo Rubber Industries, Ltd., Japan

[21] Appl. No.: 813,141

[22] Filed: Dec. 24, 1985

[30] Foreign Application Priority Data

Dec. 25, 1984 [JP] Japan .................... 59-278080

[51] Int. Cl.$^4$ .............................................. B60C 11/00
[52] U.S. Cl. ......................... 152/209 R; 152/209 B
[58] Field of Search ............................... 152/209

[56] References Cited

U.S. PATENT DOCUMENTS

| | | | |
|---|---|---|---|
| 2,120,063 | 6/1938 | Bourdon | 152/209 R |
| 3,384,145 | 5/1968 | Wolfer | 152/209 R |
| 4,254,811 | 3/1981 | Devaux | 152/209 D |

FOREIGN PATENT DOCUMENTS 1360203  7/1974  United Kingdom ............ 152/209 R

Primary Examiner—Michael W. Ball
Attorney, Agent, or Firm—Stevens, Davis, Miller & Mosher

[57] ABSTRACT

A radial tire for industrial vehicles such as a forklift truck, shovel truck, and straddle carrier which are used for cargo handling, having a tread reinforced with a plurality of stiff cord layers placed one over the other such as steel cord which is superior in cut resistance, said cord layers being arranged between said carcass ply and said tread and in proximity to said carcass ply, said tread having a large number of stepwise grooves arranged in the circumferential direction of the tire, characterized in that the raised portion divided by the stepwise grooves has at least one secondary groove which has a narrower groove width, and is superior in traction and braking performance, cut resistance, puncture resistance, wear resistance, heat resistance, and lateral stability.

8 Claims, 5 Drawing Figures

RADIAL TIRE FOR INDUSTRIAL VEHICLES

BACKGROUND OF THE INVENTION

The present invention relates to a pneumatic tire to be mounted on industrial vehicles such as a forklift truck, shovel truck, and straddle carrier which are used for cargo handling. More particularly, it relates to a radial or sermiradial tire for industrial vehicles which is characterized in that the carcass cord is high-modulus cord such as steel cord and is arranged parallel to or at an angle of by 10° to 30° with respect to the sectional direction of the tire, and the crown has a plurality of stiff belts.

The tire of this kind is required to have such fundamental performance as high traction power for quick starts, quick responsive braking force, stability at the time of cargo handling, and durability including wear resistance, puncture resistance, and heat resistance. The requirements are far more rigorous than those for truck and bus tires, not to mention passenger car tires. This is attributable to the difference of the conditions under which they are used.

Since the modern forklift truck has a high traction power, the tires mounted on it are used under severe conditions such as quick turns, quick starts, and quick braking which are repeated one after another. As compared with the general vehicle tires, the forklift truck tires are subjected far more often to torsional moment such a condition in which a large load is applied to the tires on one side of the vehicle due to a centrifugal force that arises when the vehicle makes a turn. Moreover, the forklift truck tires are subjected to a great lateral force when a reckless operator drives a forklift with the load lifted. In the case of forklift truck tire, the standard load for one tire is established rather high for the size of the tire. Under these unfavorable conditions, the rubber and cord constituting the tire lose their interfacial adhesive strength very soon.

To avoid the above-mentioned troubles, the limits for speed and loadage are established for the industrial vehicle tires, and heat resistant tires or specially designed tires are used where the operation conditions are bad. Once the tire is likely to be used under the conditions which are not expected at the time of design, it is broken due to interfacial separation of materials and cut through damage, or it causes the user to make a complain about the lack of lateral stability.

BRIEF SUMMARY OF THE INVENTION

It is an object of this invention to provide a pneumatic tire for industrial vehicles which is free of the above-mentioned disadvantages encountered in the conventional ones and is superior in traction and braking performance, cut resistance, puncture resistance, wear resistance, heat resistance, and lateral stability. The tire of this invention will increase efficiency and save cost in cargo handling operations.

DETAILED DESCRIPTION

Figure 1:
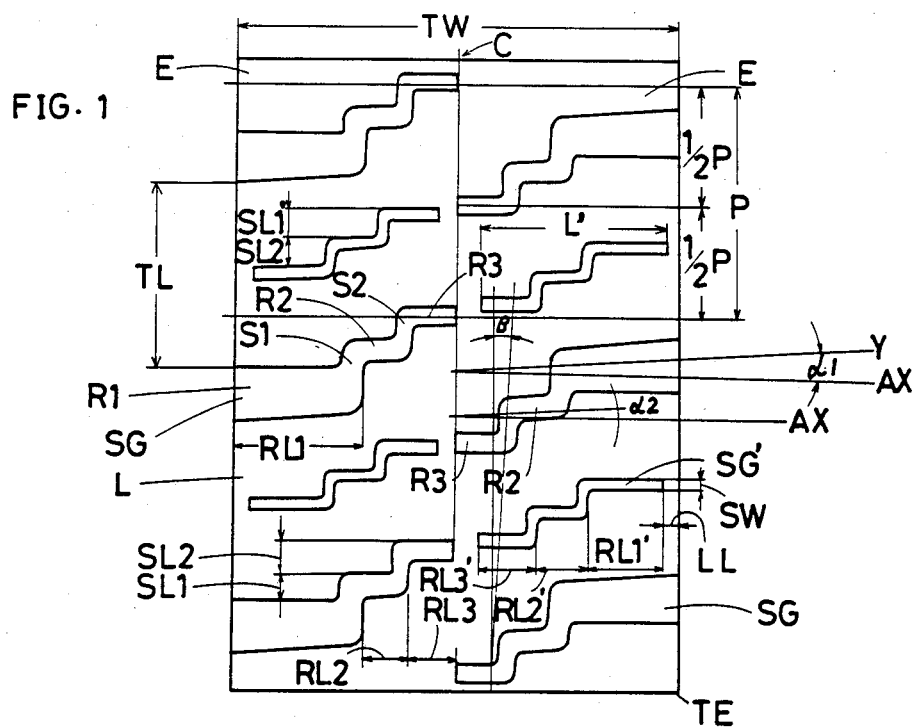
FIG. 1 is a tread pattern of the tire of this invention.

The radial tire for industrial vehicles as disclosed in this invention has the structure mentioned below.

According to this invention, the heat generation in the tire is decreased and the heat dissipation from the tire is increased, whereby the durability of the tire is improved to a great extent, owing to the specific tire construction mentioned below. A plurality of steel cord layers (belts) or the like are interposed between the tread rubber and the carcass ply and in proximity to the carcass ply. These layers have a high modulus greater than $4 \times 10^5$ kg/cm$^2$ and are highly resistant to cuts through them. They impart high puncture resistance and wear resistance to the tire of this invention. The carcass layer is formed by at least one ply of high-strength steel cord or the like arranged in the radial or semiradial direction. Thus the carcass layer is much thinner than that of the conventional cross-ply tire which is made up of six to ten plies of nylon cord.

According to this invention, the tread reinforced with the belt layers and carcass layers made of high-modulus cord as mentioned above has a unique pattern. That is, the tread has a large number of stepwise grooves arranged at a constant pitch in the circumferential direction of the tire, said stepwise grooves extending in the longitudinal and lateral directions alternately from both shoulders of the tread toward the center of the tread, and the raised portion divided by the stepwise grooves has at least one secondary groove of any desired shape.

The stepwise grooves on the tread are formed in the following manner.

(1) The stepwise grooves are arranged at a constant pitch in the circumferential direction of the tire. The stepwise grooves on one half separated by the tread center line are half-pitch shifted from those on the other half.

(2) Each of the stepwise grooves has two or more steps as it extends toward the tread center line.

(3) The widthwise grooves constituting the stepwise grooves are arranged such that the center line of the first widthwise groove at the tread shoulder is slanted by 0° to 30° with respect to the axis of tire rotation and the center line of the remaining widthwise grooves is slanted by 0° to 10° with respect to the axis of tire rotation.

(4) The lengthwise grooves constituting the stepwise grooves are slanted by 0° to 10° with respect to the tread center line.

(5) The pitch of the stepwise grooves in the circumferential direction is 40 to 55% of the tread width.

(6) The width of the tread reinforced with the high-modulus belts is 120 to 150%, preferably 130 to 150% of the width of the applicable rim, and the radius of curvature of the contact area is greater than 500 mm, preferably 700 to 800 mm.

(7) The area of the opening of all the grooves accounts for 10 to 30%, preferably 15 to 25% of the contact area of the tread under inflation at nominal pressure.

(8) The length of the lengthwise grooves constituting the stepwise grooves is 20 to 40%, preferably 25 to 35% of that of the widthwise grooves.

(9) The raised portion formed and divided by the stepwise grooves arranged as mentioned above has at least one secondary groove. The stepwise grooves and the secondary grooves are formed alternately in the circumferential direction of the tire. The secondary groove may be of any shape such as square, rectangular, and zigzag.

As mentioned above, the tread width is greater than the rim width, or the tread width is 120% to 150% of the rim width, and the radius (R) of curvature of the tread is greater than 500 mm, or the tread has the wide flat profile. Because of this tread structure, the stiffness of the tread shoulders in the lengthwise and widthwise directions is increased, whereby the lateral stability of the tire is improved.

A plurality of plies comprised of steel cord which are placed in the tread crown contribute to the improvement of puncture resistance and cut resistance, without decreasing heat resistance.

Wear resistance may be increased if the effective contact area at the center of the tread is increased and the area of the opening of the grooves is decreased. However, this is accompanied by a decrease of traction and braking performance. These contradictory requirements are satisfied at the same time in this invention by forming the grooves as follows. The length (RL1) of the widthwise groove at the tread shoulder, which contributes mostly to traction and braking performance, is 20 to 38% of the tread width. Moreover, the widthwise grooves are formed such that the angle ($\alpha 1$) between the groove center line (Y) and the axis (AX) of tire rotation is smaller than 30°. If the angle ($\alpha 1$) is greater than 30°, a thrust force occurs in the sectional direction and a shear force occurs between the tread rubber and the belt or at the belt end. This leads to peeling of the tread rubber from the belts or peeling at the belt end.

According to this invention, wear resistance is improved by arranging the layer or high-modulus steel cord in the tread crown. This layer increases the stiffness of the contact area of the tread.

The pitch of the stepwise grooves in the circumferential direction is 40 to 55% of the tread width, and the stepwise grooves on one half separated by the tread center line are half-pitch shifted from those on the other half. This generates high traction and braking force. If the pitch of the stepwise grooves is greater than 55% of the tread width, the traction and braking force of the tire decreases. On the other hand, below 40%, wear resistance decreases because the area of the opening of the grooves accounts for a large portion of the contact area of the tread and the movement of the tread increases.

Each of the raised portions formed and divided by the stepwise grooves has at least one secondary groove whose maximum width is 1 to 8% of the tread width. This secondary groove cools the tread as it draws in and breathes out air during the tire rotation, and this cooling contributes to the tire durability. The secondary grooves also improve the wet grip performance.

According to this invention, the pitch of the stepwise grooves, the slant angle of the widthwise grooves and lengthwise grooves, the length and position of the grooves, the area of the opening of the grooves, and the width and the radius of curvature of the tread are specified as mentioned above. They are effective in the overall improvement of lateral stability, puncture resistance, wear resistance, heat resistance, heat durability, cut resistance, and traction and braking performance.

The invention is described with reference to the accompanying drawings.

Figure 2:
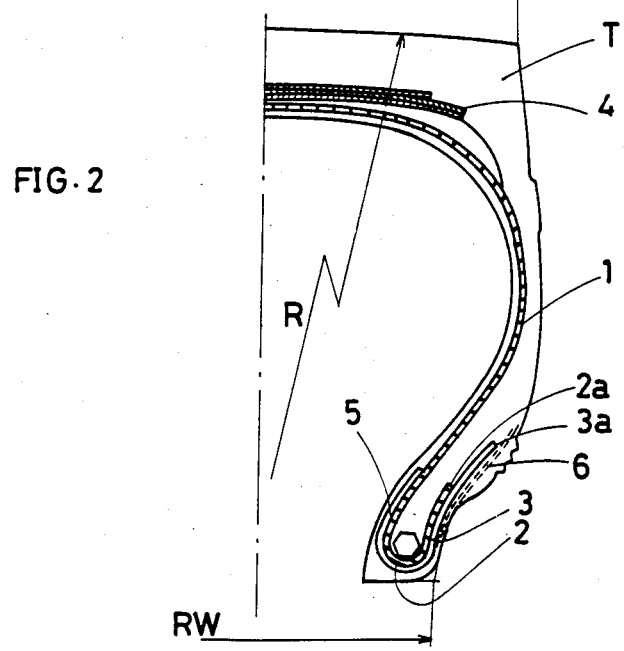
FIG. 2 is sectional view of the tire shown in FIG. 1.

In FIG. 2, the edges of the carcass ply (1) are folded back from inside to outside around the paired bead cores (5). The steel cord of the carcassply (1) is arranged at 90° to the equatorial plane of the tire. The reinforcing layer (3) of steel cord is arranged immediately outside the folded part (2) of the carcass ply (1) such that the upper end (3a) thereof is positioned above the folded upper end (2a) of the carcass ply (1). The fiber cord reinforcing layer (6) is arranged at the outside of the reinforcing layer (3) such that the upper end thereof is positioned above the upper end (3a) and the lower end is positioned on the side of the bead cores (5). The tread reinforcing stiff belt layer (4), which is composed of a plurality of steel cords or like material which is superior in cut resistance, is arranged in the circumferential direction between the tread rubber T and the car rcass play and in proximity to the carcass ply. A large number of stepwise grooves (SG) are formed on the tread at a constant pitch in the circumferential direction. Each of the stepwise groove (SG) extends zigzag from the shoulder of the tread toward the center of the tread, forming the widthwise grooves (R) and the lengthwise grooves (S). The stepwise grooves on one half separated by the tread center line are half-pitch shifted in the circumferential direction from those on the other half. Each of the stepwise grooves (SG) has at least two steps. The center line (Y) of the first widthwise grooves (R1) at the tread shoulder (E) is slanted by 0° $\alpha 1$ of to 30°, preferably 0° to 20° with respect to the axis (AX) of tire rotation.

The traction force of a tire is determined mostly by the pattern on the tread shoulder. If the slant angle ($\alpha 1$) of the first widthwise groove (R1) is greater than 30°, the traction force decreases and a thrust force occurs in the sectional direction and a shear force occurs between the tread and the belt. This leads to peeling of the tread from the belt. Thus the angle of slant should preferably be smaller than 20°. The slant angles ($\alpha 2, \alpha 3, \ldots \alpha n$) of the center lines of the remaining widthwise grooves (R2, R3, . . . , Rn) to the axis of tire rotation should be 0° to 10°. This arrangement is is intended to maintain the traction performance when the tread shoulder at one side does not hold the road completely while the vehicle is making a turn or when the vehicle is driven on soft ground. The traction effect decreases if the slant angles $\alpha 2, \alpha 3, \ldots, \alpha n$ are greater than 10°.

At least two lengthwise grooves (S) are necessary to constitute each of the stepwise grooves (SG). In the illustrated embodiment, there are two lengthwise grooves S1 and S2. The slant angle (B) of the lengthwise grooves S1, S2, . . . , Sn to the tread center line should be 0° to 10°. The slant angle (B) has to do with the draining of water that exists between a wet road and the tread, and it also contributes to the directional stability on a dry road. With the slant angle $\beta$ greater than 10°, the tread is poor in water draining performance and directional stability. The slant angle $\beta$ should be 0° where high directional stability is required. The ratio of the total length of the lengthwise grooves (Sn) to the total length of the widthwise grooves (Rn), as represented by the formula $P = (SL1 + SL2)/(RL1 + i RL2 + RL3)$, should be 20 to 40%, preferably 25 to 35%. With the ratio (P) greater than 40%, the tire is improved in directional stability but becomes poor in traction and braking performance. On the other hand, with the ratio (P) smaller than 20%, the tire becomes poor in directional stability.

The pitch (P) of the stepwise grooves (SG) in the circumferential direction should be 40 to 55% of the tread width. It is closely related to the traction and braking performance and wear resistance of the tire. The stepwise grooves on one half separated by the tread center line (C) are half-pitch shifted from those on the other half.

On the raised portion (L) formed and divided by the above-mentioned stepwise grooves (SG) is formed the secondary groove (SG') having the groove width (SW). The secondary groove (SG') extends from the point which is a length (LL) inside from the tread EOGE (TE) and is at the middle of the length (TL) of the raised portion in the circumferential direction, in parallel with the axial direction of the tire toward the equatorial plane of the tire. The secondary groove (SG') is made up of three widthwise grooves, each having the length of RL1', RL2', and RL3', and two lengthwise grooves, each having the length of SL1' and SL2', which are arranged in a zigzag pattern. The ratio of the total length of the lengthwise grooves (Sn) to the total length of the widthwise grooves (Rn), as represented by the formula $P=(sL1'+SL2')/(RL1'+RL3')$, should be 20 to 40%, perferably 25 to 35%. The narrow secondary groove divides the raised portion (L) on the tread into two parts, each having approximately the same width. The width of the secondary groove is narrow enough for the divided parts to come close to each other when the contact area of the tire is deformed due to contact with the road, and to return to the original position when the contact area parts from the road. Because of this repeated motion, the secondary groove draws in and breathes out air to cool the tire during the tire rotation. The width of the secondary groove is about 1 to 8% of the tread width (TW). The secondary groove cools the center of the raised portion (L) on the tread where the temperature rise is at the maximum. This cooling contributes to the durability of the tire. In addition, the secondary groove breaks the water film on thewet road, leading to the great improvement of wet grip performance.

The total length of the widthwise grooves of the secondary groove ($L'=RL1'+RL2'+RL3'$) should be 20 to 40%, preferably 25 to 35% of the tread width (W). Under 20%, the air cooling effect and wet road grip performance are poor and the tire is poor in traction force, with skidding on a soft road. Over 40%, the raised portion on the tread moves excessively, resulting in fast wear and short tire life.

(EXAMPLES)

Figure 3:
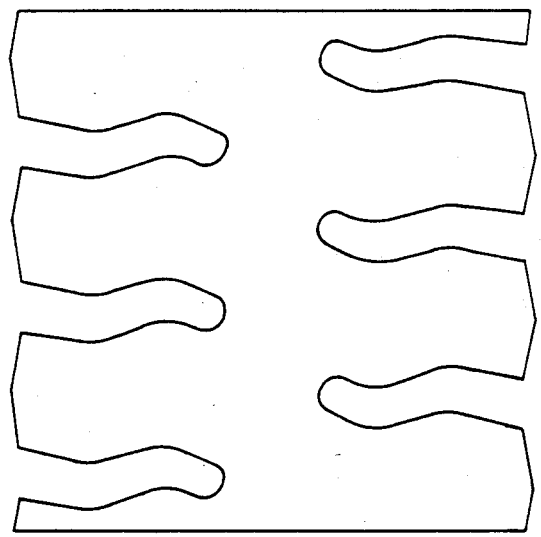
FIG. 3 is a tread pattern of a conventional tire.
Figure 4:
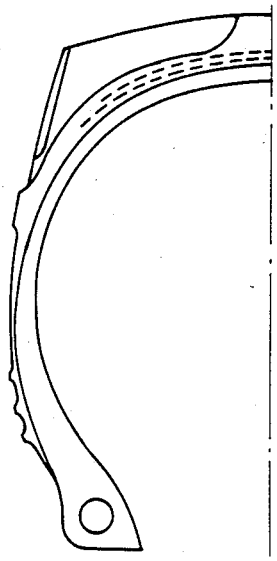
FIG. 4 is a sectional view of the tire shown in FIG. 3.
Figure 5:
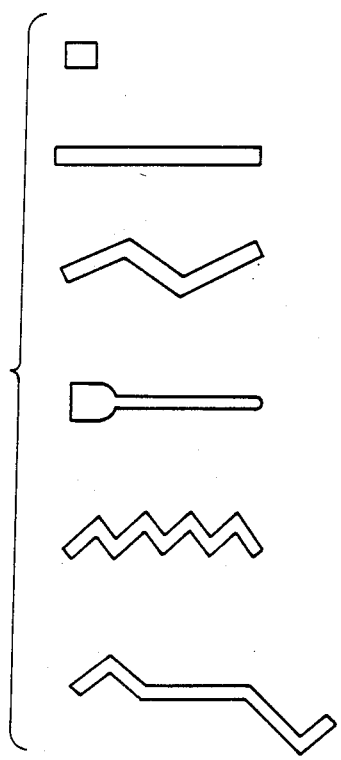
FIG. 5 shows various shapes of the secondary groove which are in accordance with this invention.

FIG. 3 shows a typical tread pattern of the conventional tire for industrial vehicles, and FIG. 4 is a sectional view of the tire of FIG. 3.

FIG. 1 is a tread pattern of the tire for industrial vehicles which is an embodiment of this invention, and FIG. 2 is a sectional view of the tire. In either cases, the tire size is 7.00-12.

In the case of the tire shown in FIGS. 3 and 4, the carcass is made up of 8 plies (equivalent to 14 ply rating (PR)) of nylon cord made of two ply yarn of 1260 denier and the breaker is made of two plies of 2/840 denier nylon cords. In the case of the tire of this invention shown in FIGS. 1 and 2, three belt layers (4) are interposed between the tread rubber (T) and the carcass ply (1) and in proximity to the carcass ply (1). Each of the belt layers is steel cord having the single wire diameter and twist structure represented by 3/0.20+6/0.38. The carcass ply (1) is a single layer of steel cord having the single wire diameter of 0.175 mm and a twist structure of 7×4.

In the tread pattern of this example, the stepwise grooves (SG) have a pitch (P) of 87 mm and there are 24 repeating units. This pitch corresponds to 51% of the tread width (W=171 mm), and the tread width (W=171 mm) corresponds to 135% of the rim width (RW=127). The radius (R) of curvature of the tread is 900 mm.

The length (RL1) of the first widthwise groove is 50 mm, which corresponds to 29% of the tread width (TW). The total length of the lengthwise grooves (SL1+SL2) is 23 mm, and the total length of the widthwise grooves (RL1+RL2+RL3) is an angle 85.5 mm, with their ratio being 27%. The angle ($\alpha 1$) is 3° which is between the center line (Y) of the first widthwise groove (R1) and the axis (AX) of tire rotation. The angles ($\alpha 2$ and $\alpha 3$) are 0° which are angles between the center lines of the widthwise grooves R2 and R3 and the axis (AX) of tire rotation. The angle ($\beta$) of the lengthwise grooves (S1 and S2) to the equatorial plane of the tire is 0° so that the tire exhibits its directional stability to the maximum.

The secondary grooves (SG') are formed on the raised portions (L) at a constant pitch in the circumferential direction alternately with the stepwise grooves (SG).

The following is the particulars of the tread pattern in this example.

| Items | Values |
|---|---|
| LL | 6.5 |
| SW | 5.0 |
| RL1' | 27.5 |
| RL2' | 16.0 |
| RL3' | 16.0 |
| L'/TW × 100% | 34.8 |
| SL1' | 9.0 |
| SL2' | 8.5 |
| SW | 5.0 |
| SW/TW × 100% | 2.9 |

The conventional tire shown in FIGS. 3 and 4 and the tire of this invention shown in FIGS. 1 and 2 were evaluated for the following items.

(HEAT RESISTANCE AND WEAR RESISTANCE)

The heat durability of the tire was evaluated by an indoor testing machine and the wear resistance was evaluated by rapid test. The results are shown in Table 1.

(ROLLING RESISTANCE)

The rolling resistance of the tire was measured with an indoor testing machine, and the results are indicated in terms of index in Table 1.

TABLE 1

|  | Conventional tire | Tire in example | Remarks |
|---|---|---|---|
| Heat durability | 3 hr | 400 hr | Time to break |
| Wear resistance (index) | 100 | 280 | 2.8 times better |
| Rolling resistance (index) | 100 | 70 | 30% less |

(CUT THROUGH RESISTANCE)

The cut through resistance was evaluated by the indoor test. The results expressed in terms of an index where a conventional tire equals 100 are shown in Table 2.

TABLE 2

|  | Tire in example | Conventional tire |
| --- | --- | --- |
| 7.00–12 | 142 | 100 |
| 6.50–10 | 152 | 100 |
| 6.00–8 | 148 | 100 |
| 21 × 8–9 | 155 | 100 |

(TRAVELING STABILITY)

The actual traveling test was run using a forklift (2.5 ton loadage) equipped with 7.00–12 front tires and 6.50–10 rear tires. Items for evaluation include shock, attenuation of pitching, and rolling which are experienced when the loaded forklift gets over a projection; and shock and attenuation of pitching which are experienced when the unloaded forklift gets over a projection. The results of the overall evaluation are shown in Table 3.

TABLE 3

| Evaluation of feeling with an actual forklift | |
| --- | --- |
| | Comprehensive evaluation |
| Conventional products | 100 |
| Products in example | 118 (better) |

(WET GRIP PERFORMANCE)

The braking test was conducted by braking an actual forklift (2.5 ton loadage) equipped with 7.00–12 front tires and 6.50–10 rear tires which was running at a speed of 30 km/h on a wet road. The coefficient of friction ($\mu$) was measured. The results expressed in terms of index are shown in Table 4.

TABLE 4

|  | Wet grip performance |
| --- | --- |
| Conventional products | 100 |
| Products in example | 108 |

It will be understood from the above-foregoing that the present invention provides radial tires for industrial vehicles which meet the requirements for important performance and satisfy the users' needs.

What is claimed is:

1. A radial tire for industrial vehicles, comprising:

a tire carcass having a pair of bead cores and a crown portion therebetween;

a tread radially outward of said crown portion having a tread width of 120 to 150% of the rim width of the applicable rim;

a carcass ply, having one ply of radially arranged cords such as a steel cord made of high-modulus material, and extending from bead to bead through the tread crown of the tire, with both ends thereof folded back around said pair of bead cores;

a belt layer, comprsing a plurality of plies of cords made of stiff cords such as steel cords of superior cut resistance, and disposed between the carcass ply and the tread to reinforce the tread;

a plurality of stepwise grooves (SG), in the tread and spaced apart at a constant pitch in the circumferential direction of the tire, and extending from both shoulders of the tread toward the center of the tread, the stepwise groove consisting of axially extending widthwise groove portions (R1 - - -) and circumferentially extending lengthwise groove portions (S1 - - -) to form at least two steps;

a secondary groove (SG') in the tread on a raised portion between the stepwise grooves;

the center line of the first widthwise groove portions (R1) of the stepwise groove postioned axially outermost at the tread shoulder being slanted by 0° to 30° with respect to the axial direction of the tire, and the center line of the other widthwise groove portions (R2 - - -) being slanted 0° to 10° with respect to the axial direction;

the center line of the lengthwise groove portions (S1 - - -) of the stepwise groove slanted by 0° to 10° with respect to the tread center line; and the length of the first widthwise groove portions (R1) of the stepwise groove being 20 to 38% of the tread width.

2. The tire of claim 1 wherein the radius of the radially outer surface of the tread is greater than 500 mm.

3. The tire of claim 1 wherein the ratio of the total length of the lengthwise groove portions to the total length of the widthwise groove portions is 20 to 40%.

4. The tire of claim 1 wherein the pitch of the stepwise grooves is 40 to 55% of the tread width.

5. The tire of claim 1 wherein half of the stepwise grooves separated by the tread center line are half-pitch shifted in relation to the grooves on the other half.

6. The tire of claim 1 wherein the circumferential maximum groove width of the secondary groove is about 1 to 8% of the tread width.

7. The tire of claim 1 wherein the secondary groove consists of axially extending widthwise grooves and circumferentially extending lengthwise grooves to form at least two steps.

8. The tire of claim 1 wherein the length of the secondary groove in the axial direction of the tire is 20 to 40% of the tread width.

* * * * *